US008963922B2

(12) United States Patent  
Li et al.

(10) Patent No.: US 8,963,922 B2  
(45) Date of Patent: Feb. 24, 2015

(54) AUTOMATIC PRESENTATIONAL LEVEL COMPOSITIONS OF DATA VISUALIZATIONS

(71) Applicant: International Business Machines Corporation, Armonk, NY (US)

(72) Inventors: Yunyao Li, San Jose, CA (US); Huahai Yang, San Jose, CA (US); Michelle X. Zhou, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 13/705,246

(22) Filed: Dec. 5, 2012

(65) Prior Publication Data

US 2014/0152667 A1 Jun. 5, 2014

(51) Int. Cl.
G06T 11/20 (2006.01)
G06T 1/00 (2006.01)

(52) U.S. Cl.
CPC .. *G06T 11/20* (2013.01); *G06T 1/00* (2013.01)
USPC ............................ 345/440; 707/705; 707/756

(58) Field of Classification Search
USPC .................................. 345/440; 707/705, 756
See application file for complete search history.

(56) References Cited

U.S. PATENT DOCUMENTS

| | | | |
|---|---|---|---|
| 7,840,600 B1 | 11/2010 | Bhatia | |
| 8,140,586 B2 | 3/2012 | Stolte et al. | |
| 8,261,193 B1 * | 9/2012 | Alur et al. | 715/742 |
| 2008/0201326 A1 * | 8/2008 | Cotter et al. | 707/5 |
| 2009/0235285 A1 * | 9/2009 | Kim et al. | 719/328 |
| 2009/0313601 A1 | 12/2009 | Baird et al. | |
| 2010/0114844 A1 * | 5/2010 | Xiong | 707/693 |
| 2011/0131194 A1 * | 6/2011 | Ma et al. | 707/705 |
| 2011/0214050 A1 | 9/2011 | Stambaugh | |
| 2011/0301977 A1 * | 12/2011 | Belcher et al. | 705/3 |
| 2012/0017165 A1 | 1/2012 | Gardner et al. | |
| 2012/0053986 A1 | 3/2012 | Cardno et al. | |
| 2012/0089920 A1 | 4/2012 | Eick | |
| 2012/0128334 A1 * | 5/2012 | Cheok et al. | 386/278 |

OTHER PUBLICATIONS

Abiteboul et al. "Modeling the Mashup Space", ACM, WIDM 2008, Oct. 30, 2008, Napa Valley, CA, 8 pgs.
"Rapidly Develop Web-Based Analytical Scientific Applications", http://www.idbs.com, Paper, idbs, 2009.
Presto Wires Datasheet, "Presto Wires Visual Mashup Composer", data sheet http://www.jackbe.com/downloads/Jackbe_Wires_July 2009-2 PDF.

(Continued)

*Primary Examiner* — Maurice L McDowell, Jr.
(74) *Attorney, Agent, or Firm* — David Zwick; Libby Z. Toub

(57) ABSTRACT

Embodiments of the invention provide for generating a data presentation artifact. In one aspect of the invention a first data presentation object and a second data presentation object are received from a repository. The first data presentation object defines a first data presentation artifact. The second data presentation object defines a second data presentation artifact. At least one mashup operation is identified that may be performed using the first data presentation object and the second data presentation object. One or more mashup operations are selected from the identified mashup operations. A third data presentation artifact is then generated by applying the selected mashup operations to the first and the second data presentation objects.

20 Claims, 6 Drawing Sheets

(56) References Cited

OTHER PUBLICATIONS

"Presto App Depot—Find, Use and Share Secure Enterprise Apps Easily", JackBe, http://www.jackbe.com/downloads/JackBePrestoAppDepotDatasheet.pdf, downloaded May 22, 2012.

"Presto Mashboard—Business-Driven App Dashboards", Datasheet, JackBe, http://www.jackBe.com/downloads/datasheets/JackBePresto Mashboard Datasheet.pdf, downloaded May 22, 2012, 2 pgs.

Morton et al. "Dynanic Workload Driven Data Integration in Tableau", ACM, SIGMOD 2012, May 20-24, 2012, Scottsdale, AZ, 9 pgs.

Tableau Desktop, Tableau Software, 2012, http://www.tableausoftware.com/products/desktop, 5 pgs.

Altinel et al, Damia: "A Data mashup fabric for intranet applications". pp. 1370-1373, in VLDB, 2007.

Catarci et al, "Visual Query Systems for Databases: A Survey", Journal of Visual Languages and Computing, 8(2): 215-260, 1997.

Ennals et al, "Mashmaker: Mashups for the Masses", SIGMOD, Jun. 11-14, 2007.

Stolte et al, "Polaris: A System for Query, Analysis and Visualization of Multi-dimensional Relational Databases", IEEE Transactions on Visualization and Computer Graphics, 8 (1) pp. 52-65, 2002.

Ioannidis et al, "Conversational Querying", Inf. Syst. 31, (1), pp. 33-56, 2006.

Li et al, "NaLIX: A Generic Natural Language Search environment for XML Data", ACM Trans. Database Syst. 32, Nov. 4, 2007, Article 30.

Yang et al, Ordinary Users' Comprehension and Preferences for Composing Information Graphics, ACM Transactions on Computer-Human Interaction, vol. 9, No. 4, Article 39, Mar. 2010.

SiSense, "Do-it-Yourself BI Software," SiSense Prism, p. 1-2, http://www.sisense.com/business-intelligence-diy.aspx, Accessed on: May 25, 2012.

* cited by examiner

FIG. 3

AUTOMATIC PRESENTATIONAL LEVEL COMPOSITIONS OF DATA VISUALIZATIONS

BACKGROUND

Embodiments of the invention relate to automatic presentational level compositions of data visualizations. Demands for visualizing and presenting large scale data on a display continue to increase as users have become more reliant on their computer systems in their business and everyday lives. Typically, the data is presented in the form of a chart, containing large volumes of data confined to the dimensions and composition of the display. A data chart is a type of diagram or graph that represents a set of numerical or qualitative data. Charts are often used to make it easier to understand large quantities of data and the relationship between different parts of the data. Charts can usually be read more quickly than the raw data they are derived from.

SUMMARY

Embodiments of the invention provide for generating a data presentation artifact. In one aspect of the invention a first data presentation object and a second data presentation object are received from a repository. The first data presentation object defines a first data presentation artifact. The second data presentation object defines a second data presentation artifact. At least one mashup operation is identified that may be performed using the first data presentation object and the second data presentation object. One or more mashup operations are selected from the identified mashup operations. A third data presentation artifact is then generated by applying the selected mashup operations to the first and the second data presentation objects.

BRIEF DESCRIPTION OF THE SEVERAL VIEWS OF THE DRAWINGS

FIG. 3 illustrates an exemplary graphical user interface of a mashup composer program for rendering data presentation artifacts, according to an embodiment of the present invention.

DETAILED DESCRIPTION

Figure 1:
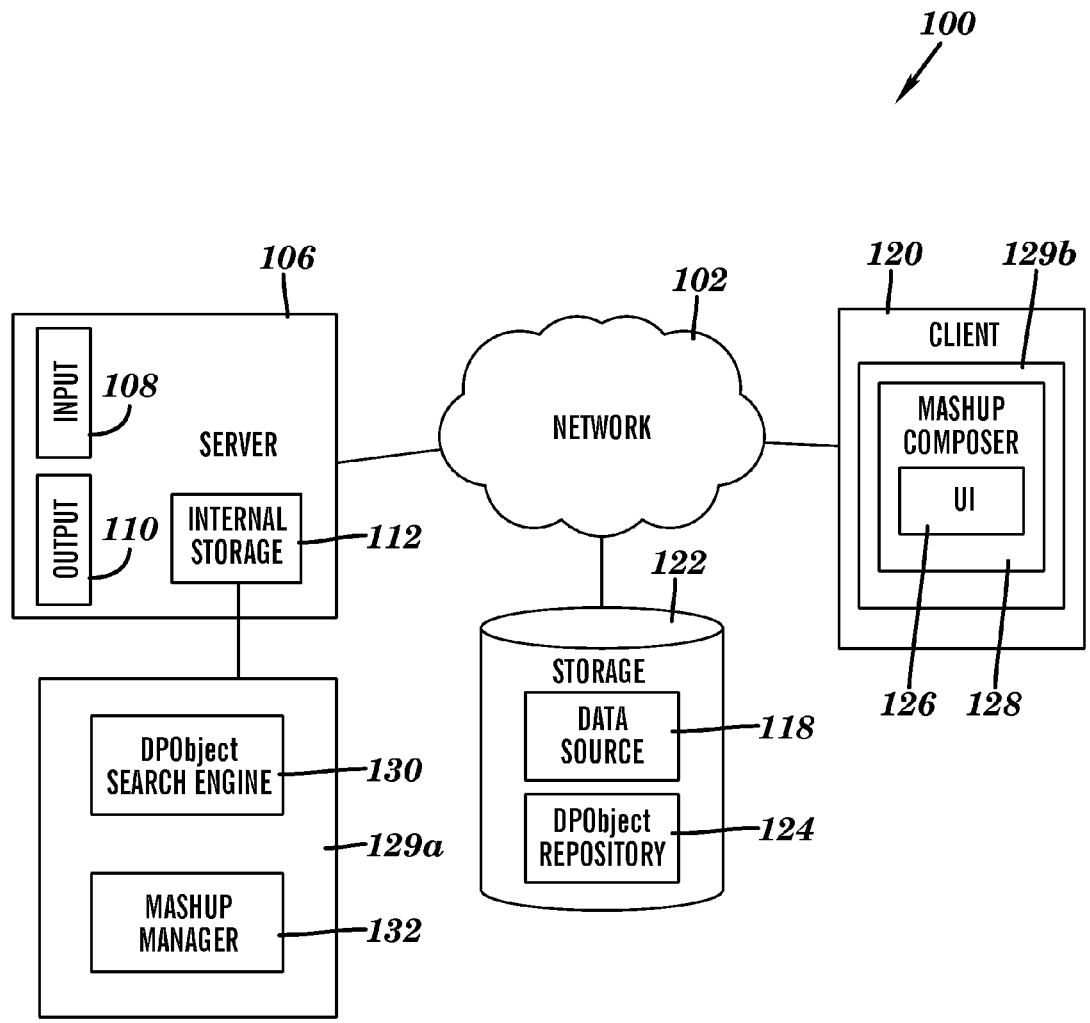
FIG. 1 is an illustration of a distributed data processing environment for generating data presentation artifacts in accordance with an embodiment of the present invention.

Embodiments of the present invention recognize that, while many applications for the analysis of data (data visualization applications) are available, such applications are primarily designed for specially trained expert users. The focus of known visualization methods is on providing a single visual design, or type of visual or graphical representation, to represent data. In other words, the focus may be, for example, to produce a single bar graph to be displayed, or a single pie chart to be printed. This is very limiting to a user who may want to show different aspects of the data in a single data presentation artifact. Consequently, most of the known BI tools are designed for specially trained expert users such as business analysts. These BI tools may not therefore empower non-expert users with the ability to create usable data presentation artifacts with ease.

Embodiments of the present invention further recognize that, because data is typically used by end users in the final presentational form as data presentation artifacts, defined further below, mastering the intricacy of creating data presentation artifacts from data is a requirement for using existing data visualization applications. The term "data presentation artifact", as used herein, refers broadly to an object generated for visual data representation purposes. Examples of data presentation artifacts may include, but are not limited to, pie charts, bar charts, line charts, linear graphs, a non-linear graphs, tree graphs, spreadsheet charts, scatter plots, and tables.

The illustrative embodiments used to describe the invention generally address and solve the above-described problems and other problems related to visualization and presentation of large scale data. Generally, an embodiment enables users to selectively combine or correlate multiple previously generated data presentation artifacts representing different datasets to generate new data presentation artifacts. In one example, a user may select (e.g., "click" using a mouse, touchpad, or other input device) on one data presentation artifact, such as a chart, displayed visually on a screen, drag the chart across the display screen, and then drop the chart on another chart. In response to the selected chart being dropped on another chart, a visual representation of the two combined/correlated charts may be automatically generated on the display, in accordance with an embodiment of the present invention. Advantageously, an embodiment of the present invention, enables the combined visual representation to contain more information (e.g., new partitioning and/or combination of the existing datasets). Additionally, an embodiment enables incremental composition of complex visual presentations as well as collaborative generation of data presentation artifacts. Thus, various embodiments facilitate users at all levels of expertise to better utilize existing analytical instrumentation and to generate new insights from previously created data presentation artifacts.

Embodiments of the present invention will now be described with reference to the figures. Various embodiments of the present invention may be implemented generally within any distributed computing environment suited for allowing users to design data presentation artifacts. More specifically, embodiments of the present invention may be implemented in a presentation level mashup application that may be executed by one or more computing devices. The term "mashup", as used herein, refers to an application that uses or combines different visual elements and data from multiple sources. As used herein, "presentation level mashup application" refers to a set of programming instructions which, when executed by one or more processors in one or more computing devices, is operable to provide the technique described herein for designing and generating data presentation artifacts. For example, embodiments of the present invention may supplement or be implemented within a mashup editor. The term "mashup editor", as used herein, refers to a tool or platform for building mashups, which allow designers to visually construct mashups by connecting together mashup components. Exemplary mashup editors include IBM® Mashup Center (offered by International Business Machines Corporation, Armonk, N.Y.); IBM® is a registered trademark of International Business Machines Corporation, Armonk, N.Y. While some embodiments of the present invention are described with reference to an exemplary mashup designing platform interface, it should be appreciated that such embodiments are exemplary and are not intended to imply any limitation with regard to the environments or platforms in which different embodiments may be implemented.

FIG. 1 is an illustration of a distributed data processing environment for generating data presentation artifacts in accordance with an embodiment of the present invention. FIG. 1 is intended as an exemplary embodiment, not as an architectural limitation for different embodiments of the present invention, and therefore, the particular elements shown in FIG. 1 should not be considered limiting with regard to the environments in which the illustrative embodiments of the present invention may be implemented. Distributed data processing environment 100 includes client computer 120 coupled to a server computer 106 and storage unit 122 via a network 102 such as the Internet. As will be discussed with reference to FIG. 6, server computer 106 includes internal components 800a and external components 900a and client computer 120 includes internal components 800b and external components 900b. For simplicity purposes, only one client computer 120 is shown in FIG. 1, although in other embodiments, distributed data processing environment 100 can include additional client computers.

Network 102 represents a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Alternatively, the computers and other devices of distributed data processing environment 100 may be interconnected by different types of networks, such as an intranet, a local area network (LAN), or a wide area network (WAN). Network 102 may include communication connections, such as wire, wireless communication links, or fiber optic cables. Client computer 120 may be, for example, a mobile device, a telephone, a personal digital assistant, a netbook, a laptop computer, a tablet computer, a desktop computer, or any type of computing devices capable of hosting a user interface, such as an editor for designing a visual representation (e.g., presentation level mashup application described below).

In various embodiments, the presentation level mashup application 129a and 129b may be implemented as a client/server program, in which some program components of the presentation level mashup application 129a, such as mashup manager program 132 and DPObject search engine program 130, are provided on server computer 106, and other program components of the presentation level mashup application 129b, such as mashup composer program 128, is provided on the client computer 120, respectively. According to various embodiments of the present invention, a presentation level mashup application 129a and 129b may completely hide the integration mechanism from a user that is designing a mashup. For example, a user interface 126 in the presentation level mashup application 129b may allow the user to drag-and-drop data presentation artifacts and other mashup components, while hiding from the user the underlying complexity associated with the data presentation artifacts. In various embodiments, any code and other software elements, which may be needed to provide the integration and/or correlation of the data presentation artifacts, may be generated automatically by various components of the presentation level mashup application 129a and 129b. In this manner, according to the techniques described herein the data presentation artifacts integration and/or correlation may be provided transparently to the user that is designing and developing the data presentation artifacts, without the user being aware at all that the used data may be extracted from a variety of different data sources and may be conforming to a variety of different formats and/or standards.

In accordance with an embodiment of the present invention, users may directly interact with the mashup composer program 128. In one implementation, the presentation level mashup application 129a and 129b may encode information necessary to generate a data presentation artifact within a specific data structure called a Data Presentation Object ("DPObject"). While some embodiments of the present invention are described with reference to an exemplary DPObject data structure, it should be appreciated that such embodiments are exemplary and are not intended to imply any limitation with regard to the data structure type that may be used for implementation purposes. In addition, the distributed data processing environment 100 may provide facilities to store and index DPObjects.

The presentation level mashup application 129a and 129b may preferably store DPObjects in the DPObject repository 124. DPObject repository 124 may be kept in internal storage 112 of server computer 106 or in storage unit 122, as shown in FIG. 1. In some embodiments the DPObject repository 124 may be a document repository in a cloud computing environment. In addition, the storage unit 122 may contain a plurality of data sources, such as a database 118. For simplicity purposes, only one data source 118 and one storage unit 122 are shown in FIG. 1, although in other embodiments, distributed data processing environment 100 can include additional data sources and additional storage units.

As previously indicated, server computer 106 may include the presentation level mashup application program 129a. Presentation level mashup application program 129a, located in distributed data processing environment 100, may comprise program instructions stored on one or more computer-readable tangible storage devices, which may include internal storage 112 on server computer 106. Various components of the presentation level mashup application program 129a and 129b may communicate via local and/or remote processes, such as in accordance with a signal having one or more data packets (for example, but not limited to, data from one program interacting with another program in a local system, distributed system, and/or across network 102 with other systems via the signal). Data gathered, generated, and maintained for use by the presentation level mashup application program 129a and 129b may be kept in internal storage 112 of server computer 106 or in one or more databases 118 of storage unit 122.

The presentation level mashup application program 129a may include various programs or program components, such as the DPObject search engine program 130 and the mashup manager program 132. DPObject search engine program 130 may be, for example, a computer program or program component for searching DPObjects in the DPObject repository 124 based on a user specified search criteria, as discussed below in conjunction with FIG. 3. In various embodiments, when searching, DPObject search engine program 130 may search for DPObjects satisfying the search criteria using indices, such as, for example, full-text index and/or an attribute index. Mashup manager program 132 may be, for example, a computer program or program component for generating data presentation artifacts by performing mashup operations, as discussed below in conjunction with FIG. 5. DPObject search engine program 130 and mashup manager program 132 reside within the presentation level mashup application program 129a and may be localized on server 106 and/or distributed between two or more servers.

Mashup composer program 128 may be, for example, a computer program or program component capable of processing information stored within DPObjects, and rendering a data presentation artifact based on the corresponding DPObject information. Mashup composer 128 may be downloaded to client computer 120 over network 102 for use on client computer 120 and may include a user interface (UI) 126. Typically, UI 126 displays information via a display device 920 (shown in FIG. 6) of external components 900b (shown in FIG. 6), such as a monitor, a laptop screen, television, or the like, and receive input from the user (as described below, for example) via one or more input devices of external components 900b, which can include, without limitation, a keyboard 930, a mouse 934, a trackball, a digitizing tablet, or the like. Client computer 120 may receive, process, display and/or otherwise render data presentation artifacts based on corresponding DPObjects.

In the illustrated example, data is communicated between server computer 106 and client computers 120 using a standard protocol such as Hyper Text Transfer Protocol (HTTP), File Transfer Protocol (FTP), Simple Object Access Protocol (SOAP) over HTTP, or the like. Distributed data processing environment 100 may include additional server computers, client computers, displays and other devices not shown. Client computer 120 is client to server computer 106 in this example. Server computer 106 may contain an input device 108 and an output device 110.

Figure 2:
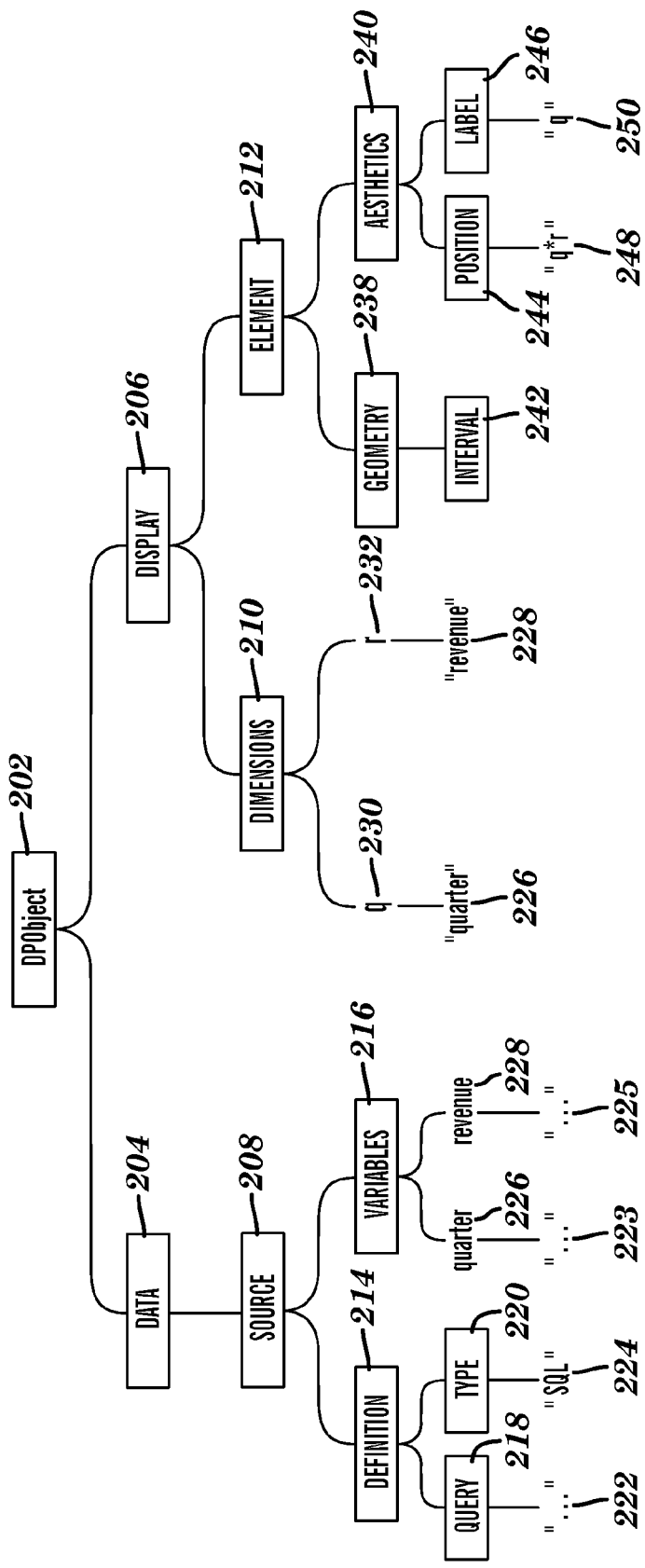
FIG. 2 is a schematic diagram illustrating an exemplary structure of a data presentation object, according to an embodiment of the present invention.

Information necessary to render a data presentation artifact may be stored in a data structure, called a DPObject (data presentation object). FIG. 2 is a schematic diagram illustrating an exemplary structure of a DPObject, according to an embodiment of the present invention. A DPObject represents a data presentation artifact. In other words, a DPObject encapsulates a definition of a corresponding data presentation artifact. A data presentation artifact definition is a set of data that includes the information that is needed to deploy and render the data presentation artifact, including, but not limited to, any information regarding graphical elements and data sets that may be employed to generate the data presentation artifact. For example, a bar chart 318 depicted in FIG. 3 may be represented by an exemplary DPObject 202 shown in FIG. 2.

The DPObject 202 may be implemented as a set of data in various formats. For example, in an embodiment illustrated in FIG. 2, the DPObject 202 may have a tree structure. Furthermore, in one embodiment, the DPObject 202 may be implemented as a JavaScript Object Notation (JSON) document. JSON is a lightweight data-interchange format. It is based on a subset of the JavaScript programming language. If DPObjects, such as DPObject 202, are implemented as JSON documents, DPObject search engine program 130 may be implemented as JSON search Application Programming Interface ("API") which may implement an internal indexing system. In some embodiments, DPObject 202 may be implemented in an extensible markup language (XML) format. In other embodiments, data presentation artifact definitions may be implemented as one or more data records in one or more files or datasets. Thus, the techniques described herein for representing data presentation artifacts are not limited to any particular type, format and/or data structure in which data presentation artifact definitions are stored.

In an embodiment, the DPObject 202 may include two components that encode properties of a corresponding data presentation artifact: a data component 204 and a display component 206. The data component 204 may encode information describing a data source and the specification of the data set that should be visualized by the data presentation artifact. As shown in FIG. 2, in one implementation the data component 204 may include a source attribute 208 describing the data source 118, which may further include two attributes: definition 214 and variables 216. Furthermore, the definition attribute 214 may be represented as a set of attributes, for example, but not limited to, a query attribute 218 and a type attribute 220. It should be noted that the presentation level mashup application program 129a and 129b may retrieve data necessary to generate a data presentation artifact from a variety of data sources 118 including any combination of, but not limited to, a relational data source, a multi-dimensional data source, an XML-based document, a plain text file, and the like.

The DPObject 202 abstract enables the presentation level mashup application program 129a and 129b to connect a data presentation artifact to heterogeneous and distributed sources of data. In an embodiment, the query attribute 218 may store, for example, a data access statement 222 that may be used by the presentation level mashup application program 129a and 129b to access the required data. The type attribute 220 may store a string corresponding to the format of the data access statement 222. The exemplary DPObject 202 shown in FIG. 2 illustrates a usage of relational data source. Thus, the type attribute 220 stores a string 224 indicating that the data access statement 222 represents a Structured Query Language (SQL) statement. Consequently, the data access statement 222 may store a string that may be used to retrieve the data from the corresponding data source 118. By way of example, the string 222 may include the following SQL statement:

SELECT revenue
FROM revenue_table
WHERE fiscal_year='2007';

It should be noted that the syntax of the string 222, at least in one implementation, may be data format agnostic. In other words, in an embodiment, the data type of the string 222 representing the query attribute 218 may be a plain string.

Since the DPObject 202 is at a higher level of abstraction than the underlying data, it may have a data model tailored for data visualization. In an embodiment of the present invention, an implementation of the DPObject 202 may use a vector space data model to categorize information necessary to render a data presentation artifact. Under the vector-space data model, the DPObject 202 can be conceptually viewed as a set of object-variable mappings. For illustrative purposes, the vector space data model may be expressed conceptually as a data table, where the DPObject 202 represents a row of the table and a variable represents a column of the table. However, the vector space model is less rigid than the relational model. For example, a variable of a DPObject may have multiple values. The implementation of the DPObject 202 using the vector-space model, advantageously, provides a spatial representation for information. This type of representation conveys significant structural information which may be important to many data transformation operations such as grouping or clustering or projecting.

In one embodiment, variables may be defined in the variables attribute 216 of the data component 204. The exemplary DPObject 202 shown in FIG. 2 defines two variables: quarter 226 and revenue 228. A variable may be a scalar variable or array variable. The details of the variables attribute 216 may vary between different implementations of the DPObject structure 202. Generally, it is contemplated that the variables attribute defines characteristics of a particular subset of data. These characteristics may include data type, data length, and the like and may be stored, for example, as text strings 223 and 225 shown in FIG. 2. It should be noted that in some embodiments, variables may also serve as data aggregators. For example, the data retrieved by the data access statement 222 from a data source 118 such as a data warehouse may be in a raw form. In an embodiment of the present invention, the variables component 216 may be used to translate the raw data stored within a data source into information (i.e. aggregate data points) that is more meaningful for visual presentation purposes. By way of example, and not of limitation, the variables component may transform the retrieved data into aggregate values such as a mean, average, minimum value, maximum value, standard deviation, variance, sum, product, and the like, and may be computed from the values retrieved by the data access statement 222.

In an embodiment of the present invention, the display component 206 of the DPObject 202 may be used to store display specifications of a corresponding data presentation artifact. It should be noted that, at least in one implementation of the DPObject 202, variables may not be used directly for display purposes. Instead, in accordance with one embodiment, a dimensions attribute 210 may be defined in the display component 206. By implementing this additional level of abstraction, the presentation level mashup application program 129a and 129b may be enabled to display the results of arbitrary calculations involving the defined variables. For example, a DPObject, such as the DPObject 202, may include a "profit" dimension, which may be defined as the difference between the two defined variables: "revenue" 228 and "expense" (not shown in FIG. 2). In another example, a "value" dimension may represent the results of expressing a "value" variable in terms of a logarithmic scale. Referring back to FIG. 2, dimensions "q" 230 and "r" 232 may represent the results of performing identity transformations on variables "quarter" 226 and "revenue" 228, respectively. As used herein, the term "identity transformation" refers to a data transformation that copies the source data into the destination data without change.

In addition to the dimensions attribute 210, the display component 206 of the DPObject 202 may include, according to an embodiment of the present invention, an element attribute 212, which may be used to describe a set of graphical elements that could be used to generate a data presentation artifact. Furthermore, the element 212 may consist of, for example, but not limited to, a geometry attribute 238 and aesthetics attribute 240. According to an embodiment of the present invention, the geometry attribute 238 may define the overall shape of the defined graphical element. As previously indicated, the DPObject 202 represents the data presentation artifact 318 shown in FIG. 3. The data presentation artifact 318 depicts the bar graph element which has the geometry type interval. Accordingly, the geometry attribute 238 of the DPObject 202 stores "interval" value 242, as shown in FIG. 2. Other exemplary values of geometry attribute 238 may include, but not limited to, a point, line, area, link, path, contour, tile, schema, and the like.

In an embodiment of the present invention, the aesthetics attribute 240 may define perceivable characteristics of a graphical element that would be mapped to the dimensions attribute 210. The aesthetics attribute 240 may include, for example, but not limited to, the following perceivable characteristics: position, color, transparency, size, label, and the like. In other words, the aesthetics attribute 240 maps perceivable characteristics to data being represented by a corresponding dimension attribute of a data presentation artifact. According to an embodiment of the present invention, a label may be implemented as a text object associated with one or more elements of the data presentation artifact. It should be noted that a label may be included as the aesthetics attribute 240, because in a data presentation artifact a label functions like a color, transparency, or other characteristic to make the data presentation artifact perceivable to a reader.

In various embodiments, the DPObject 202 could contain an arbitrarily complex mapping of the aesthetics attribute 240 to the dimensions attribute 210. In some embodiments, a set of algebraic operators may be used for the mapping operation. For example, the following algebraic operations may be employed to describe the mapping of various attributes: span (*), juxtapose (|), concatenate (+), and divide (/). As used herein, "span" operator is analogous to mathematical Cartesian product operator. For example, span (*) operator may be used to visually present to a reader that one higher dimensional attribute is spanned by multiple lower dimensional attributes, such as "show profit by quarter", where "profit" is the higher dimensional attribute and "quarter" is the lower dimensional attribute. According to an embodiment of the present invention, the juxtaposition operator (|) may be used to indicate the placement of multiple elements near each other. For instance, the juxtaposition operator may be used in the DPObject 202 if certain values of multiple dimensions need to be placed side by side in the corresponding data presentation artifact, resulting in a special two dimensional space, such as "show profits of year 2008, 2009 and 2010". In this case, the generated data presentation artifact would include three different graphical elements representing profits of years 2008, 2009, and 2010, displayed adjacent to each other. According to an embodiment of the present invention, the concatenation operator (+) may join the values of multiple dimensions to form a new dimension. For example, the (+) operator may combine the values of, for instance, 2009 and 2010 populations to create a new 2009/2010 dimension. According to an embodiment of the present invention, the division operator (/) may be used to generate a new, more granular dimension, where the values of one dimension are repeated in each value of another dimension, such as "month/year". In this scenario, data representing one or more years would be transformed into more granular data representing each month of each year.

As previously indicated, one of the perceivable characteristics that may be represented by the aesthetics attribute 240 is position. In the DPObject 202 shown in FIG. 2, the aesthetics attribute 240 is further categorized into a position attribute 244 and a label attribute 246. The position attribute 244 specifies the coordinates of displayed geometry. In other words, the position attribute 244 in combination with a coordinate system specification (two dimensional Cartesian coordinate system may be used by default) describes how the underlying data specified by the data component 204 should be shaped in the generated data presentation artifact. For example, the value 248 of the position attribute 244 of the DPObject 202 shown in FIG. 2 is represented by an expression "q*r". The value 248 indicates to the presentation level mashup application program 129a and 129b processing the DPObject 202 that the "r" dimension 232 correlated with the revenue variable 228 should be used as a measure of the data presentation artifact, occupying the Y axis, and the "q" dimension 230 correlated with the quarter variable 226 should be displayed as the category, occupying the X axis.

In accordance with an embodiment of the present invention, a new DPObject representing a desirable data presentation artifact may be generated by the presentation level mashup application program 129*a* and 129*b* by combining an existing DPObject, such as the DPObject 202 with another DPObject using one or more mashup operations.

Figure 3:
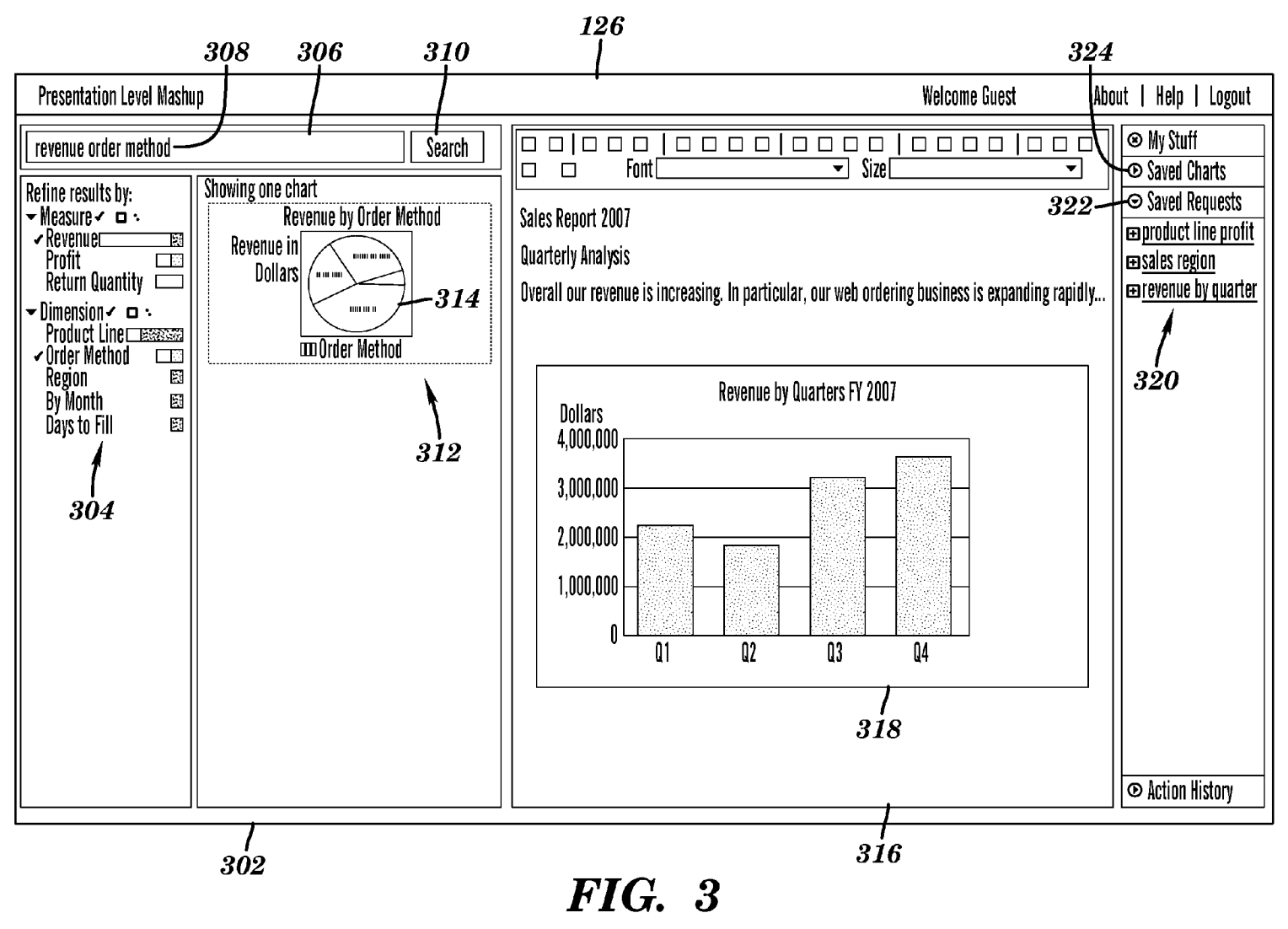

FIG. 3 illustrates an exemplary graphical user interface 126 of a mashup composer program 128, according to an embodiment of the present invention. For illustrative purposes, the various embodiments of the present invention are described in connection with a mechanism for searching the DPObject repository 124 within a user interface 300 of the mashup composer program 128.

In one embodiment, mashup composer program's 128 UI 126 layout may include a search UI panel 302 and a mashup composer panel 316. The search UI panel 302 may be used for initiating a search function according to one embodiment of the present invention. The exemplary embodiment of the present invention enables a user to find a particular data presentation artifact that may be combined with one or more other data presentation artifacts to generate a new desirable data visualization in the form of a data presentation artifact. This process of selectively merging multiple data presentation artifacts is referred to hereafter as the "presentation level mashup" process. In an embodiment of the present invention, the mashup composer program 128 enables users to use simple keyword queries to search for existing DPObjects representing corresponding data presentation artifacts. The mashup composer program 128 may receive query text 308 forming at least part of a search query entered by the user in a search field 306. As the user enters the query text 308 and presses the "Search" button 310, the mashup composer program 128 sends the search query to the DPObject search engine program 130, as described below in conjunction with FIG. 5. After performing the search of the DPObject repository 124, the DPObject search engine program 130 sends back search results in the form of one or more DPObjects.

In response to receiving the search results, the mashup composer program 128 processes the received one or more DPObjects and renders the search results 312 in the form of one or more data presentation artifacts 314. In the example shown in FIG. 3, the user has entered "revenue order method" 308. The search UI panel 302 includes the search results 312 that visually present the "revenue by order method" data. In the example shown in FIG. 3, the search results 312 are represented by a pie chart 314 showing the relationship between revenue and sales methods in a particular year. It should be noted that for some of the listed search results 312, one or more faceted search options 304 are shown, to help the user to understand the data organization structure so that he or she can better locate the needed information in the future without necessarily performing another search. For example, the faceted search options 304 indicate that the data underlying the data presentation artifact 314 includes profit by region information. This tells the user that the retrieved data presentation artifact 314 may be combined with another data presentation artifact, such as "divisions by region" to generate a new data presentation artifact visually showing the relationship between the profit and various divisions within an organization.

In the example shown in FIG. 3, the mashup composer panel 316 includes another data presentation artifact 318. The data presentation artifact 318 displayed in the mashup composer panel 316 is a bar chart showing the revenue by quarters for a particular year. This data presentation artifact 318 may have been obtained by user during a previous search. In an embodiment of the present invention, the mashup composer panel 316 may include historical search information 320. For example, a first tab 322 within the mashup composer panel 316 may enable the user to view previously submitted search queries 322 and a second tab 324 may enable the user to retrieve the previously generated data presentation artifacts. It should be noted that mashup composer program's 128 UI 126 may enable a user to move a data presentation artifact from the search UI panel 302 to the mashup composer panel 316 by, for example, a drag and drop technique. Therefore, FIG. 3 illustrates one embodiment of the present invention where one DPObject (the data presentation artifact 314) rendered by the mashup composer program 128 in response to the submitted keyword search request is displayed in the search UI panel 302 and where another DPObject (the data presentation artifact 318) have been previously placed by the user into the mashup composer panel 316.

Figure 5:
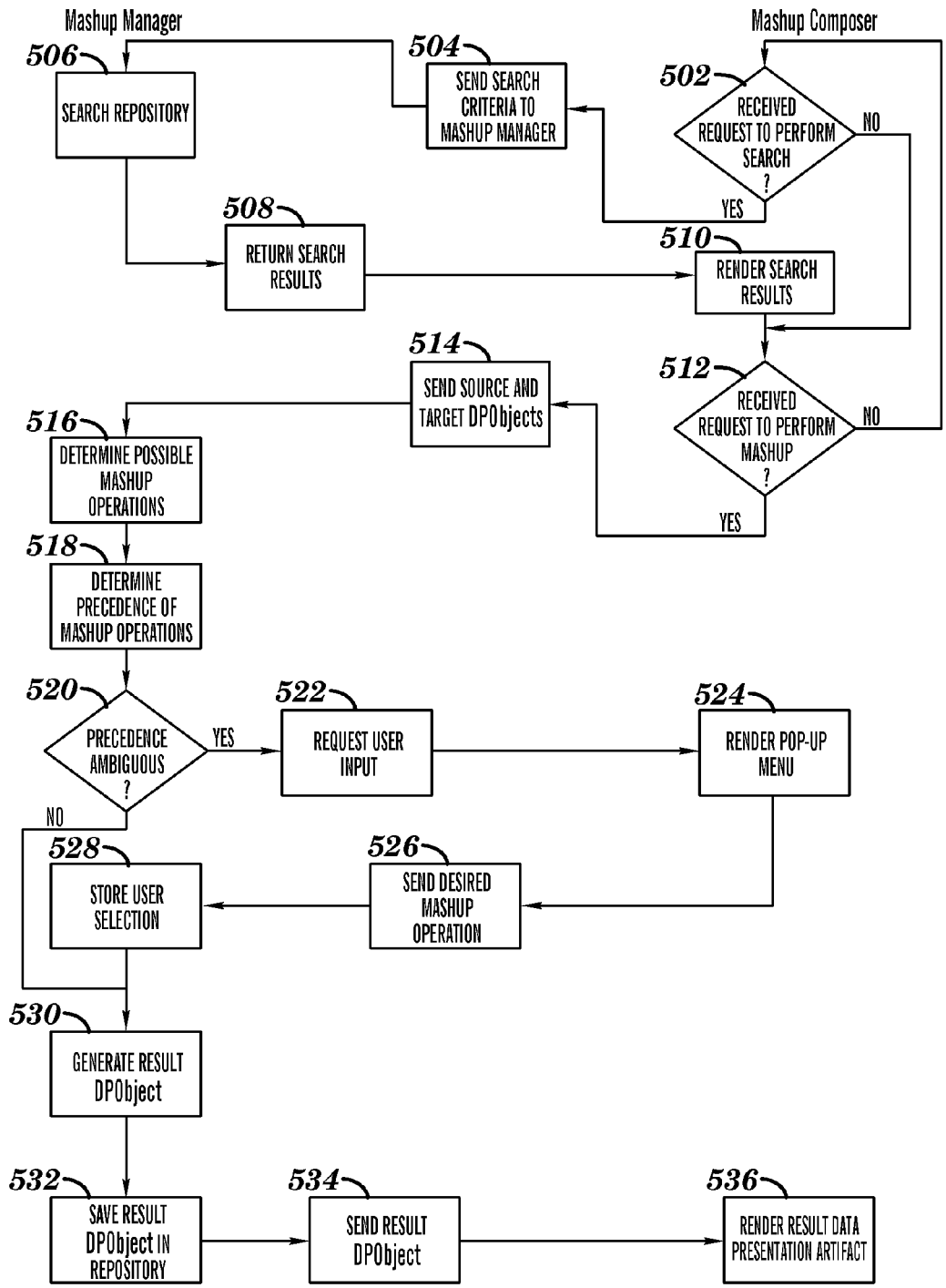
FIG. 5 illustrates steps performed by a mashup manager program and by the mashup composer program for generating data presentation artifacts, according to an embodiment of the present invention.

FIG. 5 illustrates steps performed by the mashup manager program 132 and by the mashup composer program 128 for generating data presentation artifacts, according to one embodiment of the present invention. At 502, the mashup composer program 128 may wait until it detects a search request submitted by the user. For example, the mashup composer program 128 may check periodically whether the user entered a search query in a search field of the mashup composer program's 128 UI 300, such as the search query 308 entered into the search field 306, depicted in FIG. 3. In response to receiving the search request, the mashup composer program 128 may send the search criteria, at 504, to the mashup manager program 132. In an embodiment of the present invention, the sending the search criteria (504) may involve the mashup composer program 128 sending a search query, such as the query 308, to the mashup manager program 132. In various embodiments of the present invention, the DPObject search engine program 130 may be integrated with the mashup manager program 132. According to an embodiment of the present invention, the DPObject search engine program 130 may be operable to search against the DPObject Repository 124 for DPObjects associated with the search criteria. For example, the DPObject search engine program 130 may perform the search, at 506, on each attribute in each DPObject contained in the DPObject repository 124. At least in some embodiments, the DPObject search engine program 130 may search for DPObjects satisfying the search criteria using indices, such as, for example, full-text index and/or an attribute index.

Subsequently to obtaining search results from the DPObject search engine program 130, the mashup manager program 132 may send the obtained results back to the mashup composer program 128, at 508. In an embodiment of the present invention, the search results may include one or more documents, such as JSON and/or XML documents, containing one or more DPObjects. In response to receiving the search results, the mashup composer program 128 may, at 510, process the received DPObjects, generate, and render one or more corresponding data presentation artifacts, such as the data presentation artifact 314, shown in FIG. 3.

Next, at a decision block 512, the mashup composer program 128 may determine whether it received a user request to perform a presentation level mashup dynamically. It should be noted that the mashup composer program 128 may also move to the decision block 512 in response to determining that a search request has not been received (decision block 502, no branch). In accordance with an embodiment of the present invention, each presentation level mashup involves one or more mashup operations (described in detail below) performed on two DPObjects selected by a user. Therefore, to initiate the request to perform a presentation level mashup, in accordance with an embodiment of the present invention, the user selects a pair of data presentation artifacts that should be involved in the generation of a new data presentation artifact.

In an embodiment of the present invention, the user may choose the data presentation artifacts with a drag and drop technique. For example, the user may first select a source data presentation artifact by clicking and dragging the data presentation artifact 314 displayed in the search UI panel 302, using a mouse 934, a trackball, or other pointing device. Then the user may select a target data presentation artifact by dropping the data presentation artifact 314 onto the data presentation artifact 318 displayed in the mashup composer panel 316. In this example, the latter data presentation artifact 318 becomes a target data presentation artifact. Therefore, at least in some embodiments of the present invention, the drag and drop operation performed by the user may serve as a request to perform a dynamic presentation level mashup in the decision block 512.

Since mashup operations are performed on DPObjects rather than data presentation artifacts, in response to detecting the request in the decision block 512, the mashup composer program 128 may identify two DPObjects representing the selected data presentation artifacts. In an embodiment of the present invention, the mashup composer program 128 may use the DPObject representing the first data presentation artifact 314 as a source DPObject and may use the DPObject representing the second data presentation artifact 318 as a target DPObject. At 514, in response to detecting a request to perform a presentation level mashup (decision block 512, yes branch) the mashup composer program 128 may send the identified source and target DPObjects to the mashup manager program 132. On the other hand, in response to detecting no request to perform a presentation level mashup (decision block 512, no branch) the mashup composer program 128 may return back to the decision block 502.

It should be noted that, an embodiment of the present invention contemplates that dynamic presentation level mashup may be implemented as a plurality of mashup operations applied to a pair of DPObjects. Each mashup operation, according to the embodiment, takes two DPObjects as input (i.e., the source DPObject and the target DPObject). The application of one or more mashup operations generates a third DPObject, referred to herein as the result DPObject. Generally, the dynamic presentation level mashup can be viewed as the following formula:

$$O_{source} op_{\rightarrow} O_{target} = O_{result} \qquad (1)$$

where $O_{source}$ represents the source DPObject, $O_{target}$ represents the target DPObject, $O_{result}$ represents the result DPObject, and $op_{\rightarrow}$ represents one or more mashup operations.

According to an embodiment of the present invention, the plurality of contemplated mashup operations may be categorized into two types of mashup operations: data mashup operations and display mashup operations. The term "data mashup operation", as used herein, refers to a mashup operation that modifies the data component of the target DPObject based on the data component specification of the source DPObject. As previously indicated, the data component portion of each DPObject contains encoded information describing a data source and the specification of the data set supporting the data visualization contained in the corresponding data presentation artifact. For instance, the data component 204 shown in FIG. 2 illustrates the data component of the target DPObject ($O_{target}$) representing the target data presentation artifact 318, shown in FIG. 3.

The set of available data mashup operations, in accordance with an embodiment of the present invention, may further be categorized into query expansion operations and query relocation operations. The term "query expansion operation", as used herein, refers to a mashup operation that expands the original data selection. In accordance with an embodiment of the present invention, the mashup manager program 132 may use the query expansion operation to merge data in the corresponding attributes of the source and target DPObjects when it attempts to combine/correlate those DPObjects. In the example shown in FIG. 3, the source DPObject (representing the first data presentation artifact 314) and the target DPObject (representing the second data presentation artifact 318) have different dimension attributes. Specifically, the source DPObject has the revenue and order method attributes, while the target DPObject has the revenue 228 and the quarter 226 dimensions. The query expansion operation applied to the data sets representing the source and target DPObjects, at least in some implementations, may expand the original queries to generate, for example, "order method by quarter" dataset. Therefore, the query expansion operation modifies the original data selection specification for the target DPObject based on the data selection specification of the source DPObject.

In contrast, the term "query relocation operation", as used herein, refers to a mashup operation that changes the original data selection. In accordance with an embodiment of the present invention, the mashup manager program 132 may use the query expansion operation to resolve ambiguity in the corresponding attributes of the source and target DPObjects when it attempts to combine those DPObjects. For example, if the source and target DPObjects have the following pairs of dimensions, respectively, "quarter and revenue for 2002", and "quarter and profit for 2003". Simple merge of data represented by the source and target DPObject would result in ambiguous data set. By applying the query relocation operation, the mashup manager program 132 may, for example, generate the new DPObject containing either "revenue and profit for 2002" dimensions or "revenue and profit for 2003" dimensions, thus resolving the ambiguity of the merged data. In this case, the application of the query relocation operation by the mashup manager program 132 changes the original data selection. It should be noted that in a preferred embodiment, the mashup manager program 132 may automatically select whether the result DPObject should contain the "revenue and profit for 2002" dimensions or the "revenue and profit for 2003" dimensions based on the heuristic analysis of historical user preference information, as described below.

According to an embodiment of the present invention, the plurality of contemplated mashup operations may also include display mashup operations. The term "display mashup operation", as used herein, refers to a mashup operation that modifies the display component of the target DPObject based on the display component specification of the source DPObject. It should be noted that all the attributes under the display attribute 206 shown in FIG. 2 can be modified. According to one implementation, similarly to the data mashup operations, the display mashup operations may further be categorized into display expansion operations and display relocation operations. For instance, if the display component of the target DPObject contains a bar chart attribute and the display component of the source DPObject contains a line attribute, the display mashup operation that adds the line element to the bar chart of the target DPObject illustrates the display expansion operation. On the other hand, if the display component of the target DPObject contains a bar chart attribute and the display component of the source DPObject contains a line chart, the display mashup operation that changes the geometry of the bar chart into the line chart geometry of the source DPObject illustrates the display expansion operation.

Referring back to FIG. 5, in response to receiving the source and target DPObjects, at 516, the mashup manager program 132 may dynamically infer all possible mashup operations based on the information provided in the data and display components of the received source and target DPObjects as well as based on the retrieved data. In other words, at 516, the mashup manager program 132 may utilize the specification of the source DPObject to infer possible modifications over the specification of the target DPObject. The possible mashup operations include the data mashup operations and the display mashup operations described above. At 518, the mashup manager program 132 may order the inferred operations in a precedence order. In accordance with an embodiment of the present invention, the precedence order may be determined by the heuristic analysis of the historical user preference data that may be maintained by the mashup manager program 132.

It should be noted that not all mashup operations are possible between an arbitrary pair of the source and target DPObjects. Furthermore, the precedence order of the inferred mashup operations may be ambiguous. At decision block 520, the mashup manager program 132 may determine whether the precedence order of the inferred mashup operations is ambiguous. In response to determining that the precedence order of the inferred mashup operations is ambiguous (decision block 520, yes branch), at 522, the mashup manager program 132 may send a request to the mashup composer program 128 soliciting input from the user. In an embodiment of the present invention, the request may include the source and target DPObjects combined with the list of inferred possible mashup operations. In response to receiving such request, the mashup composer program 128, at 524, may render a menu requesting a mashup operator selection by the user.

Figure 4:
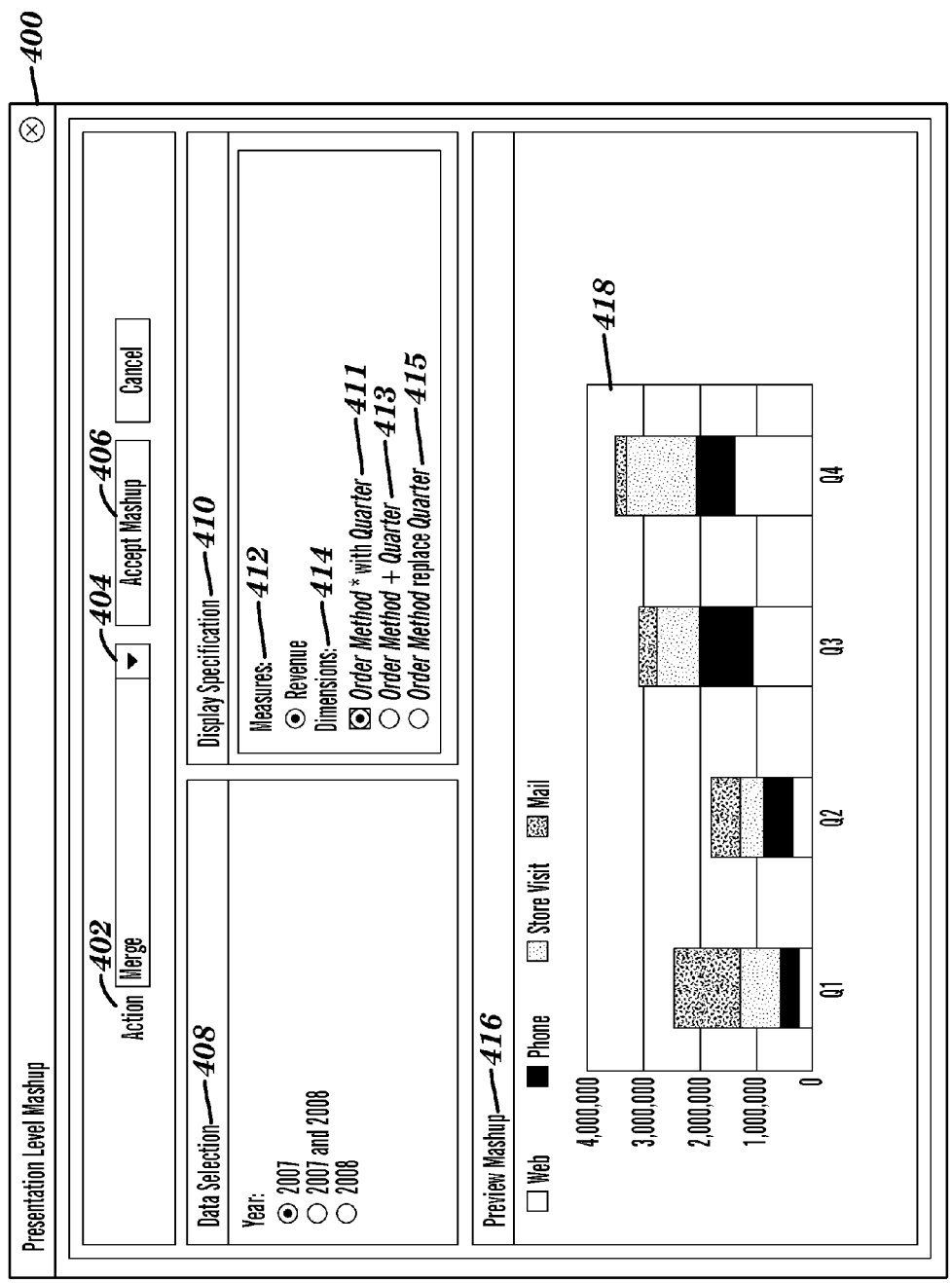
FIG. 4 illustrates an exemplary pop-up window for mashup operator selection in the exemplary graphical user interface of the mashup composer program, according to an embodiment of the present invention.

FIG. 4 illustrates an exemplary pop-up window for mashup operator selection in the exemplary graphical user interface 126 of the mashup composer program 128, according to an embodiment of the present invention. As shown in FIG. 4, the pop-up window 400 lists all the possible mashup operations as determined by the mashup manager program 132. In one implementation, the pop-up window 400 may include an "action" field 402. A user may select a desirable action from a drop down menu 404. The drop down menu may include a list of actions, such as, for example, but not limited to merge, juxtapose, overlap. In addition, the pop-up window 400 may include a data selection panel 408 and a display specification panel 410. As can be seen in the data selection panel 408, the mashup manager program 132, at 516, may have determined that both query expansion operation (i.e., changing "year=2007" into "year=2007 or year=2008") and query relocation operation (i.e. changing "year=2007" into "2008") are possible. Since the mashup manager program 132 has not been able to determine precedence of the identified operations, it has sent a request for user selection (at 522). Therefore, the data selection panel 408 asks the user to choose between the query expansion operation and the query relocation operation. Similarly, the display specification panel 410 may ask the user between the possible display mashup operations as determined by the manager program 132 at 516.

In the example shown in FIG. 4, the mashup manager program 132 has determined that revenue dimension may be used as a measure 412 of the result DPObject. In addition, at 516, the mashup manager program 132 has inferred that it is possible to combine the corresponding dimensions 414 by visually presenting in the result data presentation object that the order method attribute is spanned (*) by quarter (i.e. "order method by quarter" serves as a category occupying the X axis) (selection 411). Alternatively, it is possible to combine the order method and quarter dimensions by visually concatenating the order method and quarter attributes (i.e. "order method plus quarter" serves as a category occupying the X axis) (selection 413). In yet another alternative, the mashup manager program 132 may have inferred that it is possible to replace the order method dimension with the quarter dimension (selection 415). In the data selection panel 408 and the display specification 410 the user is asked to make explicit cheeses. In accordance with the embodiment of the present invention illustrated in FIG. 4, the mashup composer program 128 may also render a preview of the result data presentation artifact 418 that may be generated based on the user's selections of the mashup operations to derive the result DPObject. The preview of the result data presentation artifact 418 may be presented in a preview mashup panel 416. Once the user is satisfied with the selected mashup operations, he or she may press a button, such as "Accept Mashup" button 406 to confirm the selected mashup operations.

Referring back to FIG. 5, in response to receiving the user's selection of the desired mashup operations, at 526, the mashup composer program 128 may send the obtained information back to the mashup manager program 132. In an embodiment of the present invention, at 528, the mashup manager program may store the user selected mashup operations for the purposes of the future heuristic analysis (described above in conjunction with 518).

Next, at 530, the mashup manager program 132 may generate a new DPObject (result DPObject) based on automatically determined or user-specified mashup operations applied to the source and target DPObjects. In other words, the mashup manager program 132 may apply the user selected (or automatically determined) mashup operation over the target DPObject to create an updated target DPObject, i.e. the result DPObject. It should be noted that if the mashup manager program 132 determines in the decision block 520 that the precedence list is unambiguous (decision block 520, no branch), at least in one embodiment, the mashup manager program 132 automatically selects the operation having the highest precedence to generate the result DPObject at 530.

At 532, the mashup manager program 132 may save the result object generated in 530 in the DPObject repository 124. This result object may serve as either a source DPObject or a target DPObject for future data presentation artifacts generations. At 534, the mashup manager program 132 may send the result DPObject to the mashup composer program 128. At 536, the mashup composer program 128 may render a result data presentation artifact based on the specifications provided in the result DPObject. It should be noted that at least in some embodiments of the present invention, if the result DPObject was generated automatically (i.e. without the user input with regards to the mashup operations) once the mashup composer program 128 generates the data presentation artifact based on the result DPObject, the user may have an option of overriding the automatic selection of the mashup operation. For example, the mashup composer program 128 may provide a menu item which the user may select to choose a different mashup operation. In response to the user's selection of such menu item, the mashup composer program 128 may render a pop-up menu, similar to the pop-up menu 400 shown in FIG. 4, displaying all possible mashup operations and soliciting user selection.

In summary, various embodiments of the present invention facilitate users at all levels of expertise to better utilize existing analytical instrumentation and to generate new insights from previously created data presentation artifacts. Advantageously, by leveraging data structures representing previously generated data presentation artifacts, mashup operations, and heuristic analysis of user preferences, the various embodiments of the present invention enable, among other things, automatic generation of data presentation artifacts. For example, the automatically created new data presentation artifacts intelligently combine the data of the existing data presentation artifacts and visually present new insights that cannot be gathered from the original data presentation artifacts. Various specific details are set forth herein and in the Figures, to aid in understanding various embodiments of the present invention. However, such specific details are intended to be illustrative, and are not intended to restrict in any way the scope of embodiments of the present invention as claimed herein. In addition, the particular screen layouts, appearance, and terminology as depicted and described herein, are intended to be illustrative and exemplary, and in no way limit the scope of embodiments of the invention as claimed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
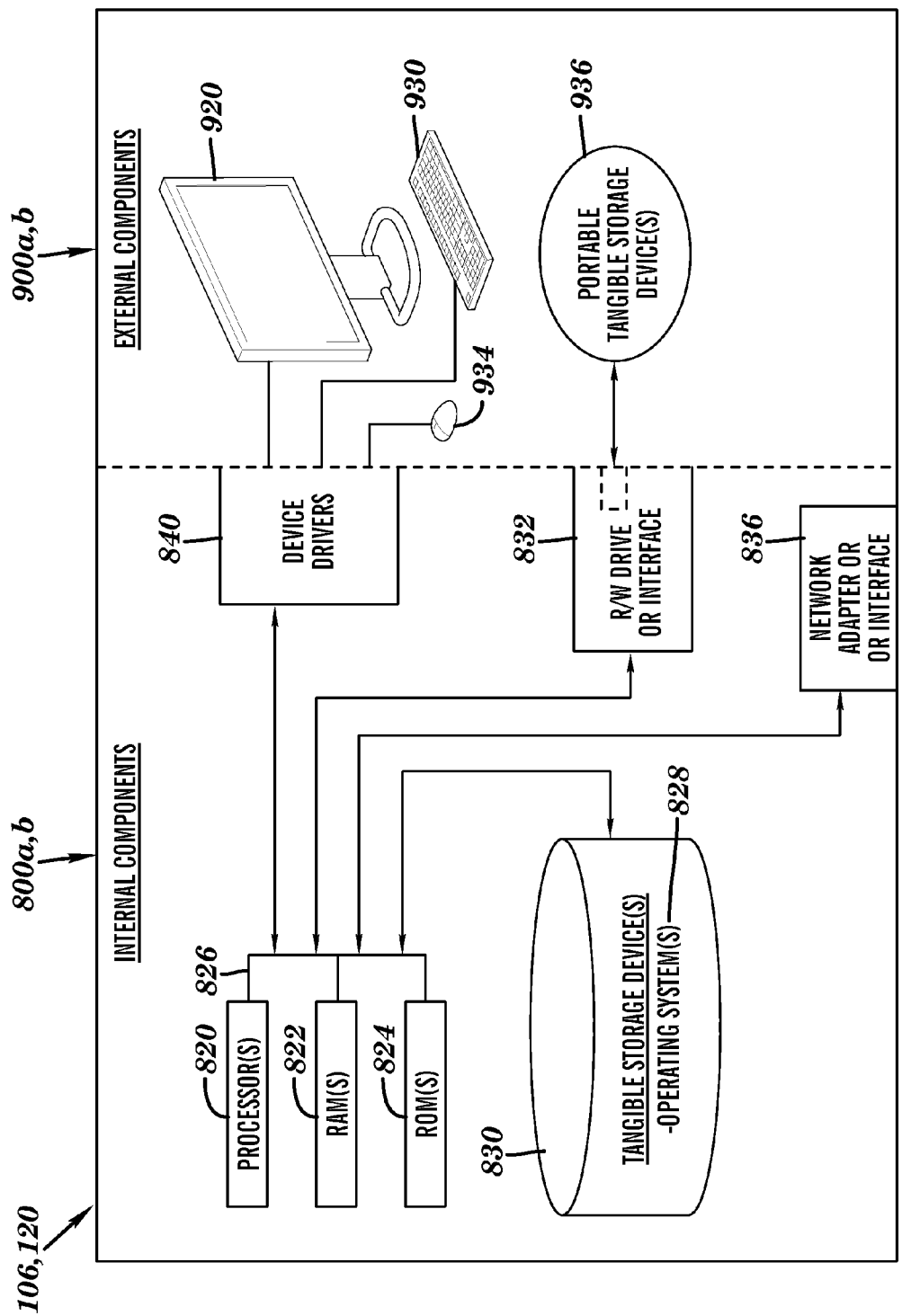
FIG. 6 is a block diagram of internal and external components of each of the computers of FIG. 1.

Referring now to FIG. 6, computing/processing devices 106 and 120 include respective sets of internal components 800a,b and external components 900a,b, illustrated in FIG. 6. Each of the sets of internal components 800a,b includes one or more processors 820, one or more computer-readable RAMs 822 and one or more computer-readable ROMs 824 on one or more buses 826, one or more operating systems 828 and one or more computer-readable tangible storage devices 830. The one or more operating systems 828 and DPObject search engine software component 130, mashup manager component (for server computer 106), and program mashup composer component 128 (for client computer 120) are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store but does not transmit a computer program and digital information.

Each set of internal components 800a,b also includes a R/W drive or interface 832 to read from and write to one or more portable computer-readable tangible storage devices 936 that can store but do not transmit a computer program, such as a CD-ROM, DVD, memory stick, magnetic tape, magnetic disk, optical disk or semiconductor storage device. The programs DPObject search engine 130 and mashup manager 132 (for server computer 106) and mashup composer program 128 (for client computer 120) can be stored on one or more of the respective portable computer-readable tangible storage devices 936, read via the respective R/W drive or interface 832 and loaded into the respective hard drive or semiconductor storage device 830.

Each set of internal components 800a,b also includes a network adapter or interface 836 such as a TCP/IP adapter card or wireless communication adapter (such as a 4G wireless communication adapter using OFDMA technology). The programs DPObject search engine 130 and mashup manager 132 (for server computer 106), and mashup composer program 128 (for client computer 120) can be downloaded to the respective computing/processing devices from an external computer or external storage device via a network 102 (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

Each of the sets of external components 900a,b includes a display screen 920, a keyboard 930 or keypad, and a computer mouse 934 or touchpad. Each of the sets of internal components 800a,b also includes device drivers 840 to interface to display screen 920 for imaging, to keyboard 930 or keypad, to computer mouse 934 or touchpad, and/or to display screen for pressure sensing of alphanumeric character entry and user selections. The device drivers 840, R/W drive or interface 832 and network adapter or interface 836 comprise hardware and software (stored in storage device 830 and/or ROM 824).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description above has been presented for illustration purposes only. It is not intended to be an exhaustive description of the possible embodiments. One of ordinary skill in the art will understand that other combinations and embodiments are possible.

What is claimed is:

1. A method for generating a data presentation artifact, the method comprising:

receiving, by a computer, from a repository a first data presentation object defining a first data presentation artifact and a second data presentation object defining a second data presentation artifact;

identifying, by the computer, at least one mashup operation that may be performed using the first data presentation object and the second data presentation object;

selecting, by the computer, one or more mashup operations from the identified mashup operations; and generating, by the computer, a third data presentation artifact by applying the selected mashup operations to the first and the second data presentation objects.

2. The method of claim 1, further comprising searching, by the computer, the repository based on a user defined search criteria.

3. The method of claim 1, wherein the first, the second, and the third data presentation artifacts are selected from the group consisting of a pie chart, a bar chart, a line chart, a tree graph, a spreadsheet chart, a scatter plot, and a table.

4. The method of claim 1, wherein generating the third data presentation artifact comprises generating, by the computer, a third data presentation object defining the third data presentation artifact and storing the third data presentation object in the repository.

5. The method of claim 4, wherein the first, the second, and the third data presentation objects comprise a JavaScript Object Notation (JSON) document.

6. The method of claim 4, wherein the first, the second, and the third data presentation objects comprise a first component and a second component, the first component and the second component containing data collectively describing a corresponding data presentation artifact and wherein the data is organized in a tree structure.

7. The method of claim 6, wherein the first component comprises a data component having a data source attribute and the second component comprises a display component having a dimension attribute and an element attribute.

8. The method of claim 7, wherein the element attribute further comprises a geometry attribute and an aesthetics attribute.

9. The method of claim 7, wherein: the one or more mashup operations include one or more data mashup operations and one or more display mashup operations, the one or more data mashup operations comprise a data modification of the data component of the first data presentation object based on the data contained in the data component of the second data presentation object, and the one or more display mashup operations comprise a modification of the display component of the first data presentation object based on the data contained in the display component of the second data presentation object.

10. The method of claim 1, wherein the one or more mashup operations are selected for application based on a user identifying the one or more mashup operations.

11. A computer program product for generating a data presentation artifact, the computer program product comprising a non-transitory computer readable storage medium having program code embodied therewith, the program code readable/executable by a processor to:

receive from a repository a first data presentation object defining a first data presentation artifact and a second data presentation object defining a second data presentation artifact;

identify at least one mashup operation that may be performed using the first data presentation object and the second data presentation object;

select one or more mashup operations from the identified mashup operations; and generate a third data presentation artifact by applying the selected mashup operations to the first and the second data presentation objects.

12. The computer program product of claim 11, further comprising the program code to search the repository based on a user defined search criteria.

13. The computer program product of claim 11, wherein the first, the second, and the third data presentation artifacts are selected from the group consisting of a pie chart, a bar chart, a line chart, a tree graph, a spreadsheet chart, a scatter plot, and a table.

14. The computer program product of claim 11, wherein the program code to generate the third data presentation artifact comprises program code to generate a third data presentation object defining the third data presentation artifact and program code to store the third data presentation object in the repository.

15. The computer program product of claim 14, wherein the first, the second, and the third data presentation objects comprise a JavaScript Object Notation (JSON) document.

16. The computer program product of claim 14, wherein the first, the second, and the third data presentation objects comprise a first component and a second component, the first component and the second component containing data collectively describing a corresponding data presentation artifact and wherein the data is organized in a tree structure.

17. The computer program product of claim 16, wherein the first component comprises a data component having a data source attribute and the second component comprises a display component having a dimension attribute and an element attribute.

18. The computer program product of claim 17, wherein the element attribute further comprises a geometry attribute and an aesthetics attribute.

19. The computer program product of claim 17, wherein: the one or more mashup operations include one or more data mashup operations and one or more display mashup operations, the one or more data mashup operations comprise a data modification of the data component of the first data presentation object based on the data contained in the data component of the second data presentation object, and the one or more display mashup operations comprise a modification of the display component of the first data presentation object based on the data contained in the display component of the second data presentation object.

20. The computer program product of claim 11, wherein the program code to select the one or more mashup operations comprises program code to select the mashup operations based on a user input.

* * * * *